(12) United States Patent
Sagarsee

(10) Patent No.: US 11,926,367 B2
(45) Date of Patent: Mar. 12, 2024

(54) BULKHEAD DOOR BEARING ASSEMBLY

(71) Applicant: The Shyft Group, Inc., Charlotte, MI (US)

(72) Inventor: Douglas Lee Sagarsee, Elkhart, IN (US)

(73) Assignee: The Shyft Group, Inc., Charlotte, MI (US)

( * ) Notice: Subject to any disclaimer, the term of this patent is extended or adjusted under 35 U.S.C. 154(b) by 383 days.

(21) Appl. No.: 17/174,373

(22) Filed: Feb. 12, 2021

(65) Prior Publication Data
US 2022/0258811 A1    Aug. 18, 2022

(51) Int. Cl.
*B62D 33/04* (2006.01)
*E05D 15/10* (2006.01)

(52) U.S. Cl.
CPC ....... *B62D 33/042* (2013.01); *E05D 15/1081* (2013.01); *E05Y 2900/531* (2013.01)

(58) Field of Classification Search
CPC .............. B62D 33/042; E06D 15/1081; E05Y 2900/531
USPC ..................................................... 296/146.1
See application file for complete search history.

(56) References Cited

U.S. PATENT DOCUMENTS

| | | | | |
|---|---|---|---|---|
| 4,644,690 A * | 2/1987 | Caimi | ................ | E05D 15/1042 49/128 |
| 7,021,007 B2 * | 4/2006 | Jacobs | ................ | E05D 15/0691 16/97 |
| 2008/0129085 A1 * | 6/2008 | Kim | ........................ | E05F 5/003 296/190.11 |
| 2009/0096339 A1 * | 4/2009 | Worner | ...................... | E05F 1/16 312/334.44 |
| 2013/0042534 A1 * | 2/2013 | Polus | .................. | E05D 15/0673 49/425 |
| 2016/0273214 A1 * | 9/2016 | Kopish | .................... | E04B 2/827 |
| 2017/0298669 A1 * | 10/2017 | Boring | ................ | E05D 15/0656 |
| 2020/0199925 A1 * | 6/2020 | Vander Bent, Jr. | ...... | E06B 3/509 |
| 2021/0235887 A1 * | 8/2021 | Goppion | ................. | E05D 15/06 |
| 2022/0194190 A1 * | 6/2022 | Baik | .................. | E05D 15/1081 |
| 2022/0282541 A1 * | 9/2022 | Fabiano | ..................... | B60J 5/06 |

FOREIGN PATENT DOCUMENTS

JP          3395109 B2 *   4/2003

* cited by examiner

*Primary Examiner* — Hilary L Gutman
(74) *Attorney, Agent, or Firm* — Barnes & Thornburg LLP

(57) ABSTRACT

An illustrative embodiment of a cargo vehicle is provided. A bulkhead is located on the cargo vehicle. The bulkhead includes an opening. A bulkhead door is located at the bulkhead. The bulkhead door is movable between open and closed positions with respect to the opening. A bulkhead door bearing slide assembly is located at a portion of the bulkhead door and is movable with the bulkhead door between the open and closed positions of the bulkhead door. At least one pin is attached to the bulkhead door bearing slide assembly and is disposed through at least one opening of at least a portion of the bulkhead door. The at least one pin is movable within the at least one opening of the at least the portion of the bulkhead door to movably couple to the bulkhead door.

20 Claims, 13 Drawing Sheets

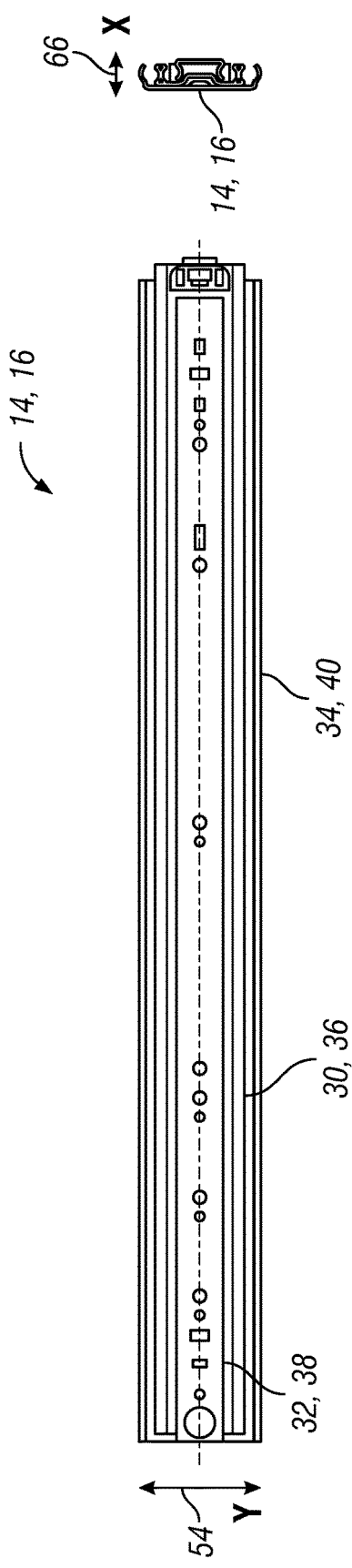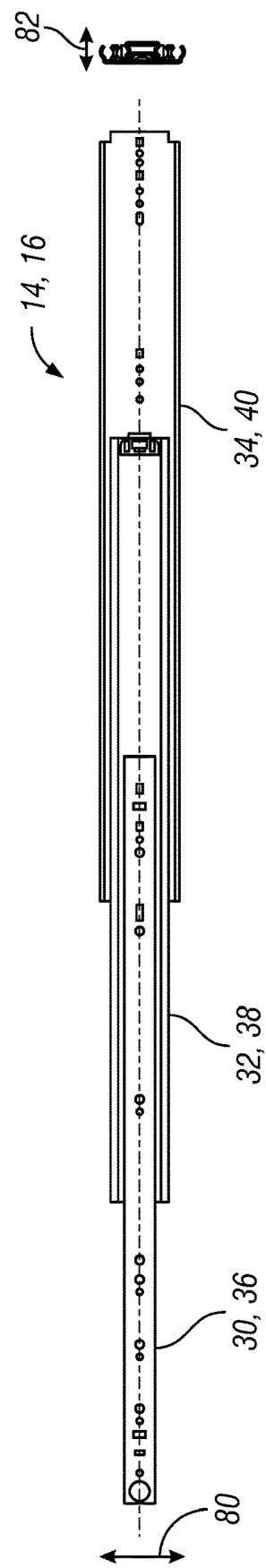

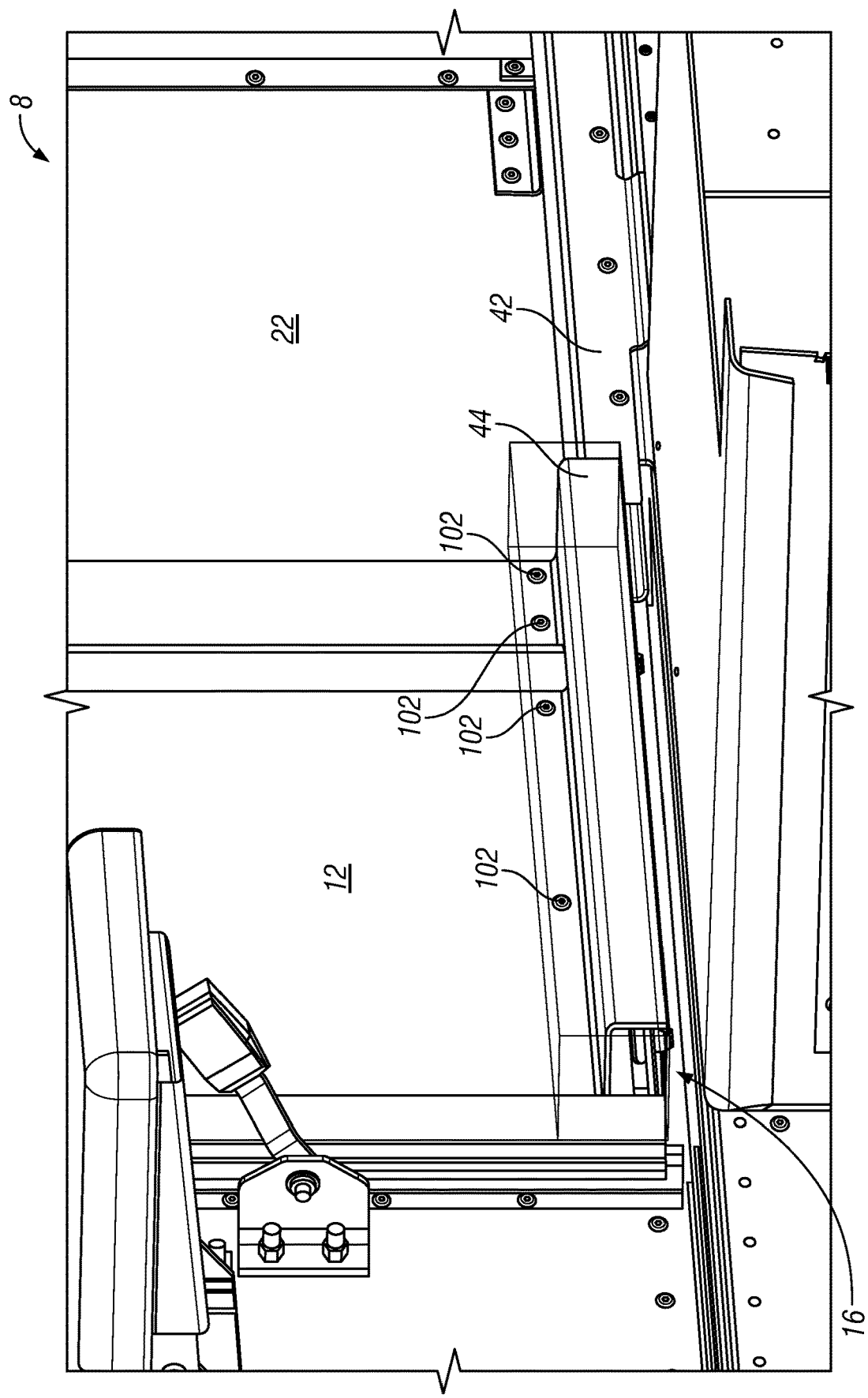

BULKHEAD DOOR BEARING ASSEMBLY

TECHNICAL FIELD AND SUMMARY

The present disclosure relates to a bulkhead door used in a delivery or cargo vehicle, and particularly, to a bearing slide assembly that slides the bulkhead door between open and closed positions.

Bulkhead doors are commonly used to separate the driver and cargo sections of a cargo or delivery vehicle. The driver can open and close the bulkhead door by sliding it back and forth adjacent the bulkhead as needed. These bulkhead doors tend to be made from a metal such as aluminum. While the vehicle is in motion, the bulkhead door has a tendency to rattle against the bulkhead making it difficult to hear outside the vehicle causing annoyance and potential safety issues for the operator. In addition, the bulkhead door may also misalign to the mating door jamb seal when the operator tries to close the bulkhead door. If the bulkhead door is slammed against the jamb to latch but not aligned the bulkhead door bounces back which might also cause warranty issues.

Accordingly, an illustrative embodiment of the present disclosure provides a cargo vehicle which comprises a driver compartment and a cargo compartment. A bulkhead is located between the driver and cargo compartments. The bulkhead includes an opening. A bulkhead door is located at the bulkhead. The bulkhead door is also movable between open and closed positions with respect to the opening. An upper bulkhead door bearing slide assembly is located at an upper portion of the bulkhead door. A lower bulkhead door bearing slide assembly is located at a lower portion of the bulkhead door. The upper bulkhead door bearing slide assembly includes at least a first carriage and a second carriage, wherein the first carriage is movable between extended and retracted positions with respect to the second carriage. The lower bulkhead door bearing slide assembly includes at least a first carriage and a second carriage, wherein the first carriage is movable between extended and retracted positions with respect to the second carriage. The upper and lower bulkhead door bearing slide assemblies are oriented transverse to each other. The first carriage of the upper bulkhead door bearing slide assembly is attached to the bulkhead and the second carriage of the upper bulkhead door bearing slide assembly is attached to the door such that when the bulkhead door is in the closed position the first carriage is located in the retracted position with respect to the second carriage. The first carriage of the lower bulkhead door bearing slide assembly is movably coupled to the bulkhead door and wherein the second carriage of the lower bulkhead door bearing slide assembly is attached to the bulkhead such that when the bulkhead door is in the closed position the first carriage is located in the extended position with respect to the second carriage.

In the above and other illustrative embodiments, the cargo vehicle may further comprise: at least one pin attached to the first carriage of the lower bulkhead door bearing slide assembly and is disposed through at least one opening of at least a portion of the bulkhead door, wherein the at least one pin is movable within the at least one portion of the bulkhead door to be movably coupled to the bulkhead door; at least one bushing disposed through the at least one opening of the at least the portion of the bulkhead door, wherein the at least one bushing receives the at least one pin which is movable relative to the at least one bushing; a float assembly that is located between a portion of the bulkhead door and the first carriage of the lower bulkhead door bearing slide assembly to allow downward movement of the first carriage with respect to the bulkhead door; the portion of the bulkhead door extends transverse from the bulkhead door, and wherein the float assembly movably couples the first carriage of the lower bulkhead door bearing slide assembly to the portion of the bulkhead door; the upper bulkhead door bearing slide assembly includes a third carriage movably coupled to the first and second carriages of the upper bulkhead door bearing slide assembly, and the lower bulkhead door bearing slide assembly includes a third carriage movably coupled to the first and second carriages of the lower bulkhead door bearing slide assembly; at least one ball bearing located in a first channel located between a first side of the first carriage and a first side of the third carriage of the upper bulkhead door bearing slide assembly, at least one ball bearing located in a second channel located between a second side of the first carriage and a second side of the third carriage of the upper bulkhead door bearing slide assembly, at least one ball bearing located in a third channel located between a third side of the third carriage and a first side of the second carriage of the upper bulkhead door bearing slide assembly, and at least one ball bearing located in a fourth channel located between a fourth side of the third carriage and a second side of the second carriage of the upper bulkhead door bearing slide assembly; collectively the first channel, the second channel, the third channel, and the fourth channel of the upper bulkhead door bearing slide assembly is oriented substantially vertical with respect to the bulkhead door; at least one ball bearing is located in a first channel located between a first side of the first carriage and the first side of the third carriage of the lower bulkhead door bearing slide assembly, at least one ball bearing located in a second channel located between a second side of the first carriage and a second side of the third carriage of the lower bulkhead door bearing slide assembly, at least one ball bearing located in a third channel located between a third side of the third carriage and a first side of the second carriage of the lower bulkhead door bearing slide assembly, and at least one ball bearing located in a fourth channel located between a fourth side of the third carriage and a second side of the second carriage of the lower bulkhead door bearing slide assembly; collectively the first channel, the second channel, the third channel, and the fourth channel of the lower bulkhead door bearing slide assembly is oriented transverse with respect to the collectively the first channel, the second channel, the third channel, and the fourth channel of the upper bulkhead door bearing slide assembly; and the upper and lower bulkhead door bearing slide assemblies are oriented substantially perpendicular to each other.

Another illustrative embodiment of the present disclosure provides a cargo vehicle. A bulkhead is located on the cargo vehicle. The bulkhead includes an opening. A bulkhead door is located at the bulkhead. The bulkhead door is movable between open and closed positions with respect to the opening. A lower bulkhead door bearing slide assembly is located at a lower portion of the bulkhead door. The lower bulkhead door bearing slide assembly includes at least a first carriage and a second carriage, wherein the first carriage is movable between extended and retracted positions with respect to the second carriage. The first carriage of the lower bulkhead door bearing slide assembly is movably coupled to the bulkhead door and wherein the second carriage of the lower bulkhead door bearing slide assembly is attached to the bulkhead such that when the bulkhead door is in the closed position the first carriage is located in the extended position with respect to the second carriage.

In the above and other illustrative embodiments, the cargo vehicle may further comprise: a driver compartment and a cargo compartment, wherein the bulkhead is located between the driver and cargo compartments; an upper bulkhead door bearing slide assembly located at an upper portion of the bulkhead door, wherein the upper bulkhead door bearing slide assembly includes at least a first carriage and a second carriage, wherein the first carriage is movable between extended and retracted positions with respect to the second carriage, and wherein the first carriage of the upper bulkhead door bearing slide assembly is attached to the bulkhead and the second carriage of the upper bulkhead door bearing slide assembly is attached to the door such that when the bulkhead door is in the closed position the first carriage is located in the retracted position with respect to the second carriage; the upper and lower bulkhead door bearing slide assemblies are oriented transverse to each other; at least one pin attached to the first carriage of the lower bulkhead door bearing slide assembly and is disposed through at least one opening of at least a portion of the bulkhead door, wherein the at least one pin is movable within the at least opening of the at least one portion of the bulkhead door to movably couple the lower bulkhead door bearing slide assembly to the bulkhead door.

Another illustrative embodiment of the present disclosure provides a cargo vehicle. A bulkhead located on the cargo vehicle. The bulkhead includes an opening. A bulkhead door is located at the bulkhead. The bulkhead door is movable between open and closed positions with respect to the opening. A bulkhead door bearing slide assembly is located at a portion of the bulkhead door and is movable with the bulkhead door between the open and closed positions of the bulkhead door. At least one pin is attached to the bulkhead door bearing slide assembly and is disposed through at least one opening of at least a portion of the bulkhead door, wherein the at least one pin is movable within the at least one opening of the at least the portion of the bulkhead door to movably couple to the bulkhead door.

In the above and other illustrative embodiments, the cargo vehicle may further comprise: the bulkhead door bearing slide assembly is a lower bulkhead door bearing slide assembly located at a lower portion of the bulkhead door; the lower bulkhead door bearing slide assembly is oriented substantially parallel to the lower portion of the bulkhead door and substantially transverse to a second portion of the bulkhead door; the lower bulkhead door bearing slide assembly includes at least a first carriage and a second carriage, wherein the first carriage is movable between extended and retracted positions with respect to the second carriage, and wherein the first carriage of the lower bulkhead door bearing slide assembly is movably coupled to the bulkhead door.

Additional features and advantages of the bulkhead door bearing slide assembly will become apparent to those skilled in the art upon consideration of the following detailed descriptions of carrying out the bulkhead door bearing slide assembly as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

FIG. 11A is a side elevational view of the bulkhead door bearing slide assembly in a retracted or collapsed position;

FIG. 11B is an end view of the bulkhead door bearing slide assembly of FIG. 11A;

FIG. 12A is a side elevational view of the bulkhead door bearing slide assembly in an extended position;

FIG. 12B is an end view of the bulkhead door bearing slide assembly of FIG. 12A;

FIG. 14 is a perspective detail view of the lower portion of the bulkhead showing the bulkhead door located in the closed position.

Figure 1:
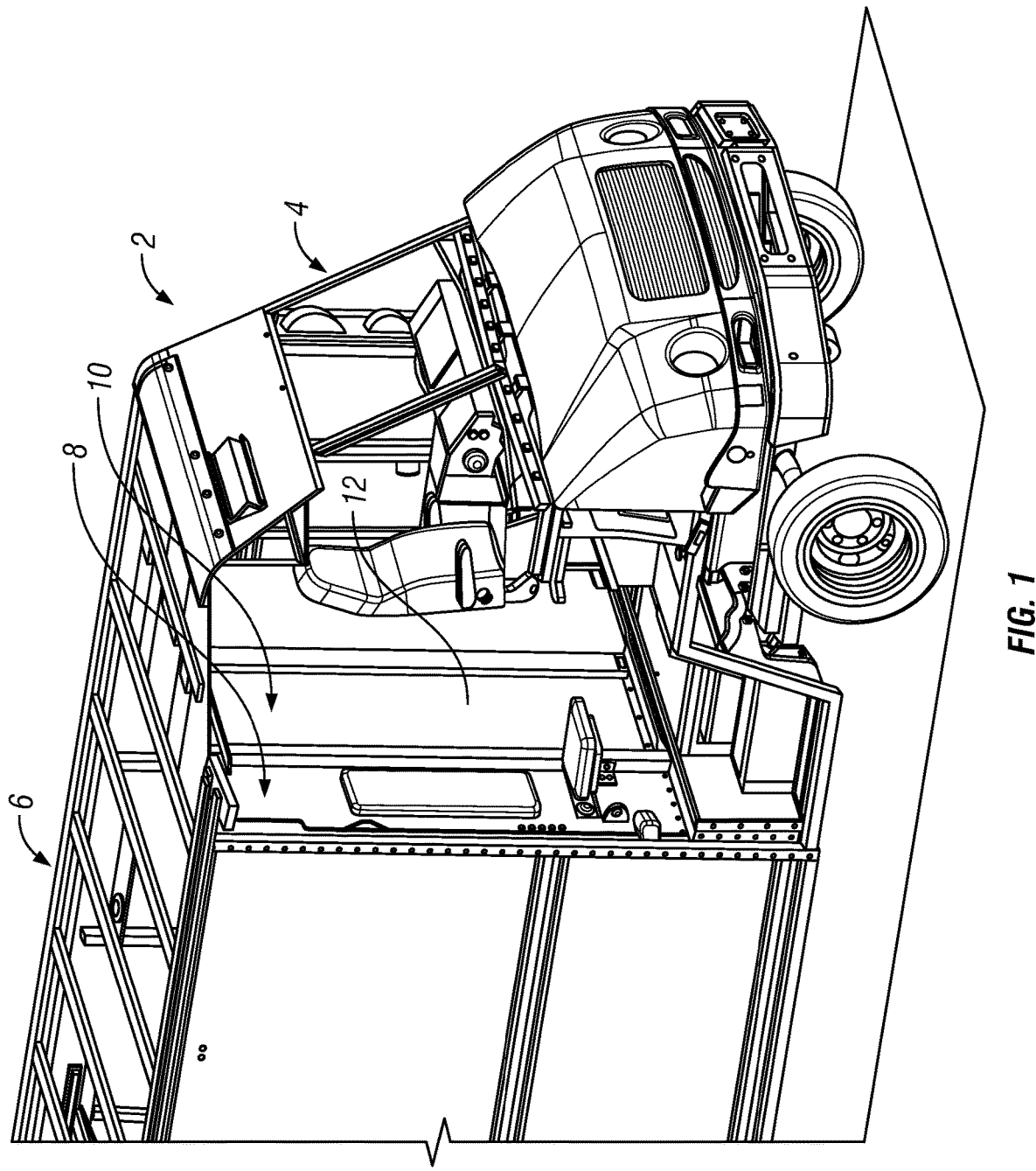
FIG. 1 is a partial cutaway perspective view of a portion of a cargo or delivery vehicle.

Corresponding reference characters indicate corresponding parts throughout the several views. The exemplification set out herein illustrates embodiments of the bulkhead door bearing slide assembly, and such exemplification is not to be construed as limiting the scope of the bulkhead door bearing slide assembly in any manner.

DETAILED DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

An illustrative embodiment of the present disclosure provides a bulkhead door bearing slide assembly that illustratively includes a first drawer-type slide, vertically oriented and sized to support the vertical load of the bulkhead door. Additionally, the first drawer-type slide may be mounted in a vertical orientation and in reverse direction so when the bulkhead door is closed the drawer guide bearing is located in its collapsed position for limiting the bulkhead door's ability to move (or rattle) in its horizontal direction. The bulkhead door bearing slide assembly also includes a second drawer-type slide mounted in a horizontal orientation. With the second drawer-type slide lying horizontally flat, its load strength is about perpendicular to the first drawer-type slide and about parallel to the ground. The second drawer-type slide may be extended when the bulkhead door is closed. With the load rating of the second drawer-type slide oriented horizontally, the bulkhead door may likewise be held horizontally to limit movement (or rattle) and a tendency to miss the bulkhead opening jamb seal when the bulkhead door is closed. Additionally, an embodiment of the present disclosure includes a slide float assembly that engages the second drawer-type slide vertically. Illustratively, the second drawer-type slide may be vertically movable with respect to one or more pins. This may reduce or eliminate misalignment issues between the second drawer-type slide and the bulkhead door. This is to account for a circumstance when the bulkhead door is being closed and the second drawer-type slide extends. When the second drawer-type slide extends it might sag slightly from its own weight. Such tolerance may be accounted-for by floating the second drawer-type slide with respect to the bulkhead door which allows vertical movement of same without interfering with the movement of the door. This allows the second drawer-type slide to be misaligned which is why the use of mounting bearing or slides to the floor and the door are not believed to be effective. By placing the first and second drawer-type slides generally perpendicular to each other places them in their strongest position when the door is closed. So while the truck is moving the bulkhead door is kept from shaking, rather than hanging the door in a track and bouncing up and down or both drawer slides bearing fully extended and in their weakest position.

A partial cutaway perspective view of a portion of cargo or delivery vehicle 2 is shown in FIG. 1. Cargo vehicle 2 includes a driver compartment 4 and a cargo compartment 6. The driver compartment 4 is illustratively at the forward portion of cargo vehicle 2 and is where an operator drives cargo vehicle 2. Cargo compartment 6, illustratively located rearward of driver compartment 4, is the space in cargo vehicle 2 where cargo such as packages, containers, or other articles are stored to be delivered to various locations. Located between driver compartment 4 and cargo compartment 6 is bulkhead 8. As illustratively shown herein, bulkhead 8 includes a wall, typically, but not exclusively, made of a metal such as aluminum. Bulkhead 8 serves as the rear wall in driver compartment 4 and the forward wall of cargo compartment 6 separating those compartments. As part of bulkhead, 8, an opening 10 is located therein for purposes of allowing ingress and egress between driver compartment 4 and cargo compartment 6. Further, a bulkhead door 12 is slideably movable between open and closed positions with respect to bulkhead 8. As illustratively shown in FIG. 1, bulkhead door 12 is located in closed position.

Under normal operation of cargo vehicle 2, bulkhead door 12 is located in a closed position while cargo vehicle 2 is traveling between delivery locations. When cargo vehicle 2 is stopped at a delivery location, the operator will slide bulkhead door 12 open to gain access to cargo compartment 6. The operator will retrieve whatever package or parcel is intended to be delivered at the delivery location and exit the vehicle either through driver compartment 4 or at the rear of cargo vehicle 2 (not shown). In either instance bulkhead door 12 will be slid closed. Throughout a typical day, bulkhead door 12 is slid between opening closed positions multiple times. As identified previously, an issue with bulkhead door and delivery or cargo vehicles is their propensity to rattle while the vehicle is in motion. An illustrative embodiment of the present disclosure assists in mitigating this rattle.

Figure 2:
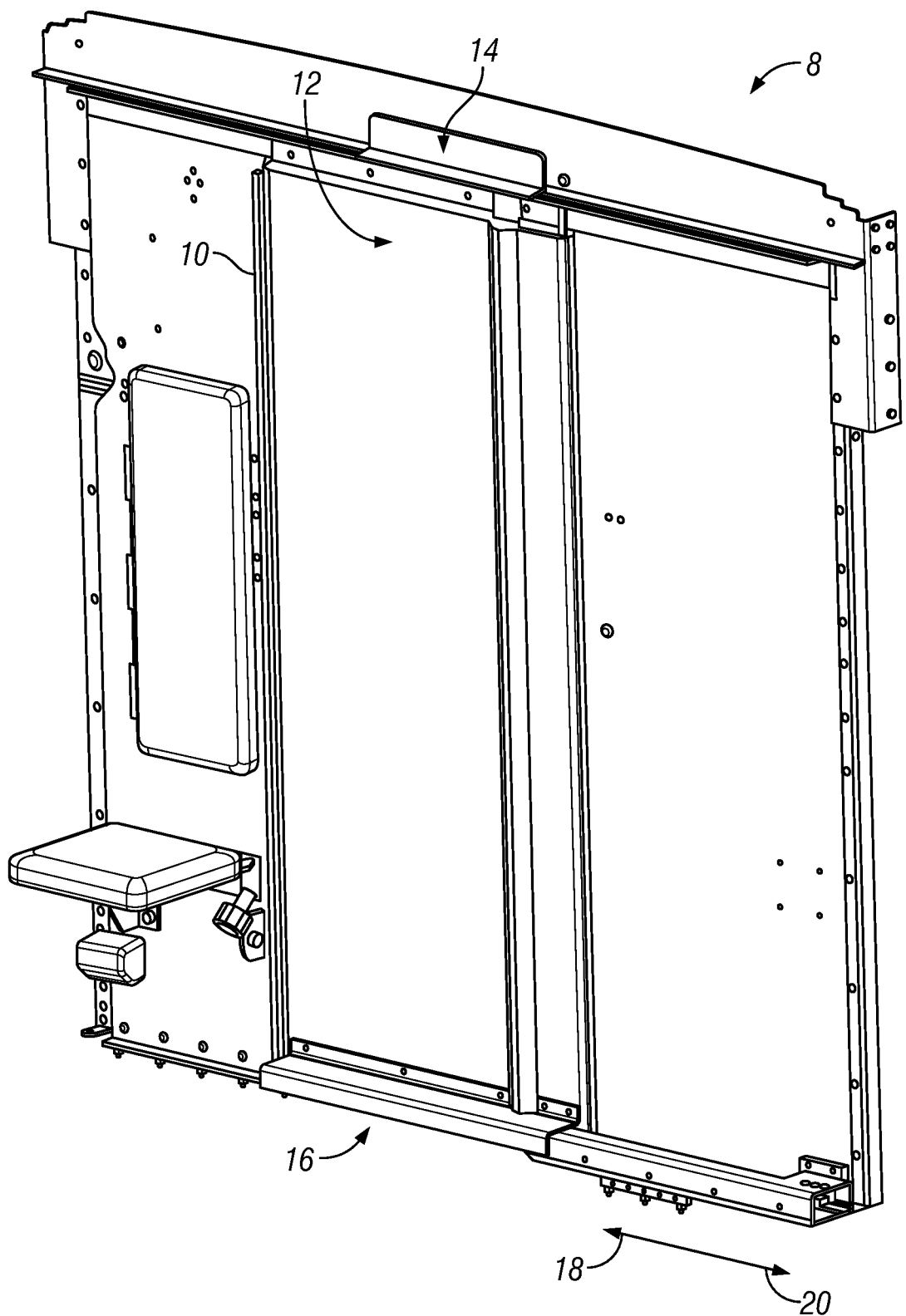
FIG. 2 is a front perspective view of a bulkhead.

A front perspective view of bulkhead 8 is shown in FIG. 2. In this view, bulkhead door 12 is shown in its closed position with respect to opening 10. This creates a full barrier with bulkhead 8 between driver compartment 4 and cargo compartment 6 (see, also, FIG. 1). In an illustrative embodiment of the present disclosure includes an upper bulkhead door bearing slide assembly 14 and a lower bulkhead door bearing slide assembly 16. Both bulkhead door bearing slide assemblies 14 and 16 guide bulkhead door 12 in sliding fashion in directions 18 and 20 between open and closed positions with respect to opening 10 and bulkhead. 8.

Figure 3:
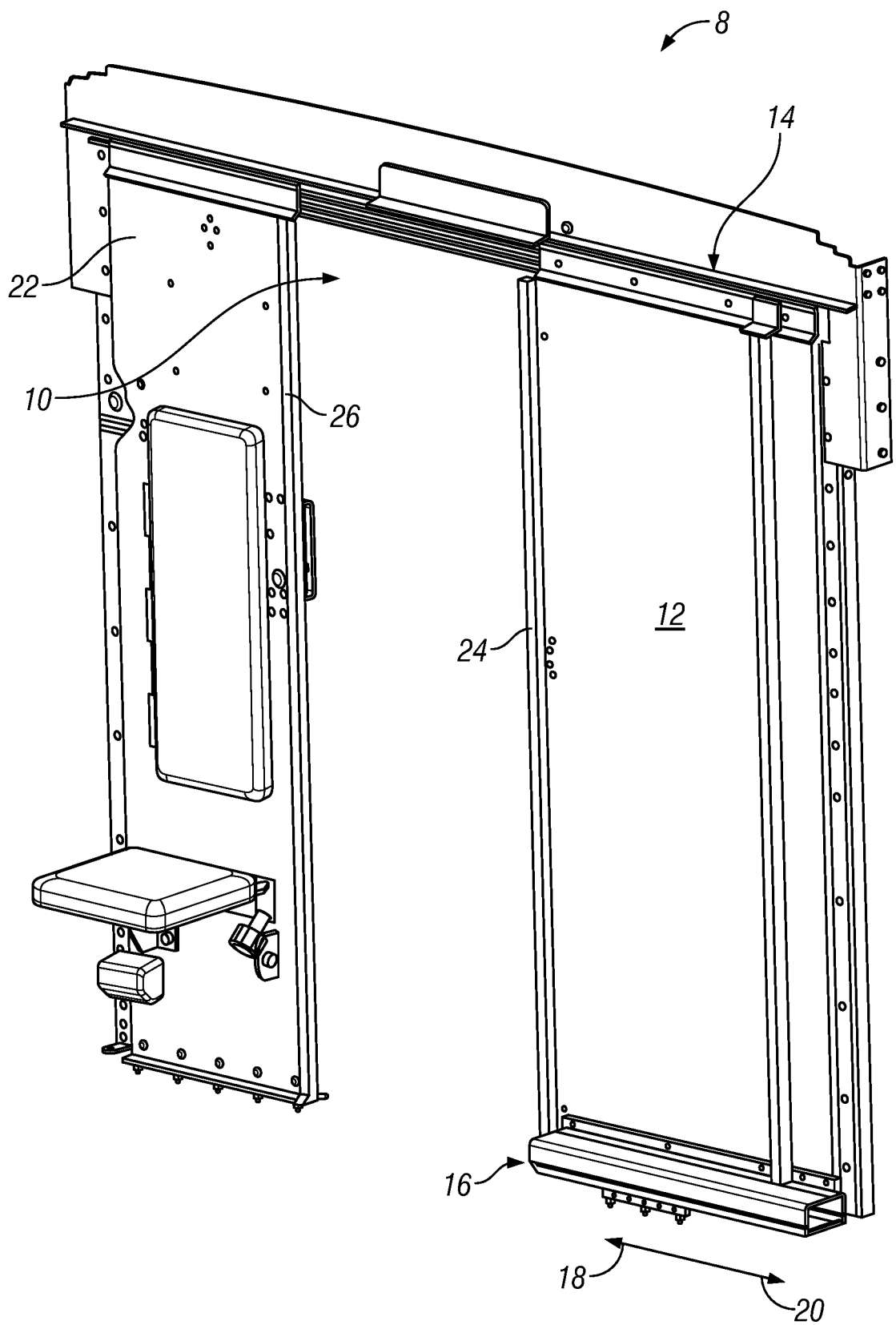
FIG. 3 is another front perspective view of the bulkhead.

Another front perspective view of bulkhead 8 but with bulkhead door 12 moved illustratively in direction 20 to an open position with respect to opening 10 is shown in FIG. 3. Comparing the views of bulkhead 8 in FIGS. 2 and 3, it is apparent how upper and lower bulkhead door bearing slide assemblies 14 and 16, respectively, operate in concert to move bulkhead door 12 in directions 18 and 20. In an illustrative embodiment, bulkhead door 12 may be made of a metal material such as aluminum, but in alternate embodiments bulkhead door 12 may be made of other rigid materials such as wood, press board, or polymer, for example, suitable for use as a sliding door in a vehicle. In either instance, it will be appreciated by the skilled artisan upon reading this disclosure that any such bulkhead door will have a sufficient amount of weight that if subject to vibrations or movement inherently created by cargo vehicle 2 while it is moving, a potential for a periodic impact with other structures of bulkhead 8 such as wall panel 22 and/or the periphery of opening 10, for example, may create a noise, such as a rattle while cargo vehicle 2 is moving. Additionally, edge 24 of bulkhead door 12 is intended to engage jamb 26 of opening 10 of bulkhead 8 when in a closed position. It is contemplated that upper and lower bulkhead door bearing slide assemblies 14 and 16 provide aligned mating between jamb 26 and edge 24.

Figure 4:
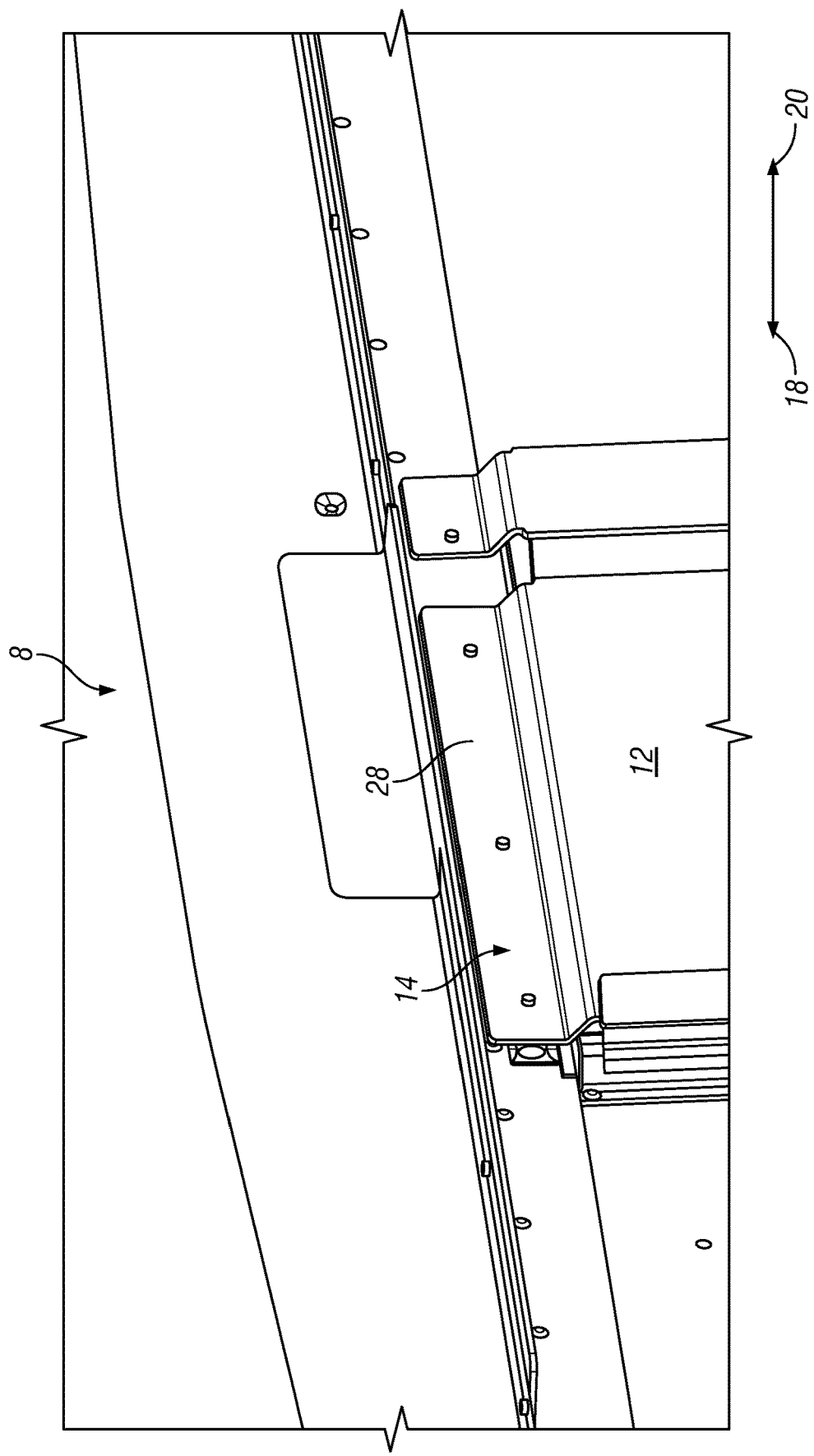
FIG. 4 is a perspective detail view of the bulkhead showing the bulkhead door in a closed position.
Figure 5:
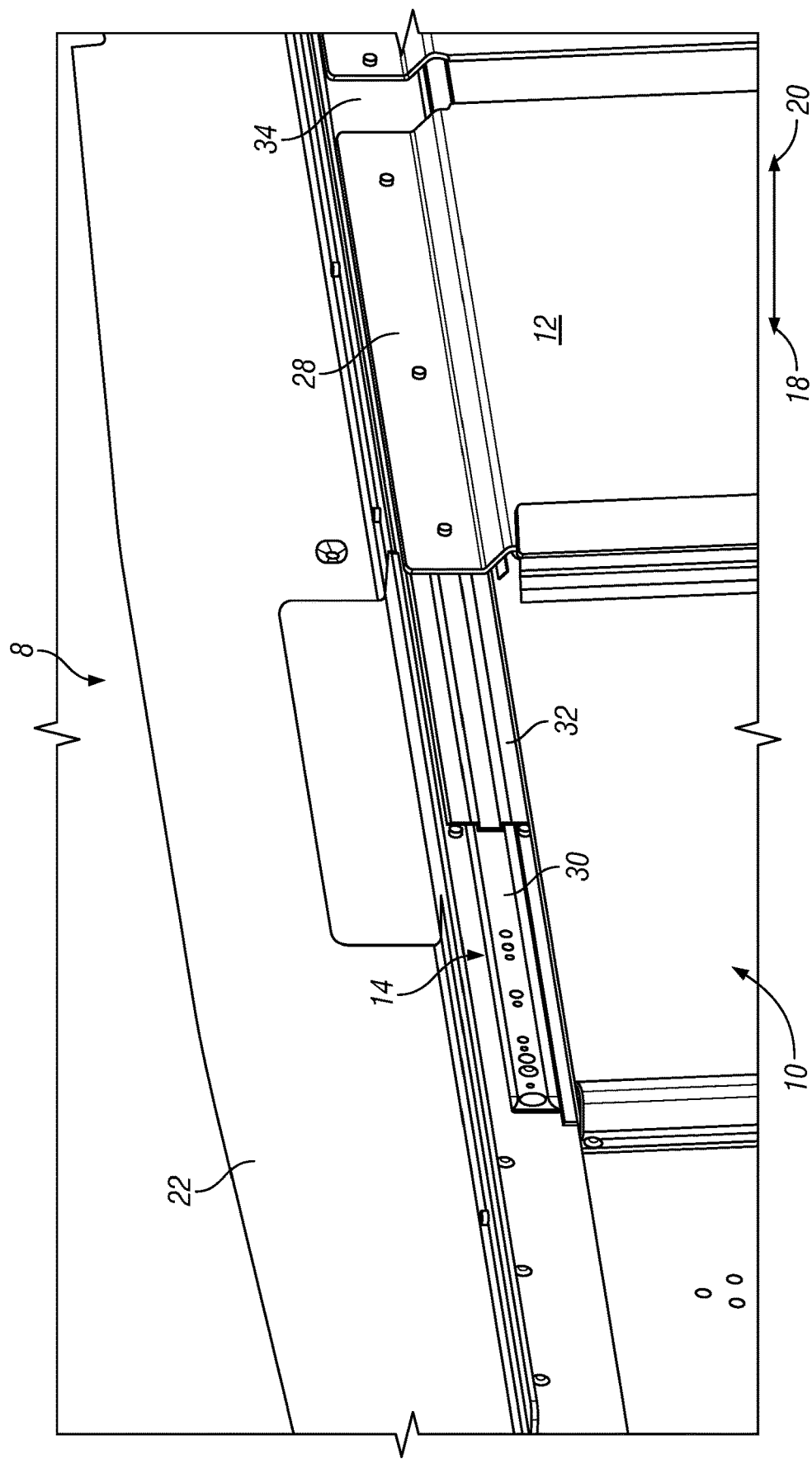
FIG. 5 is another perspective detail view of the bulkhead showing the bulkhead door located in an open position.

Perspective detail views of bulkhead 8 showing bulkhead door 12 located in closed and open positions are shown, respectively, in FIGS. 4 and 5. The view of FIG. 4 depicts upper bulkhead door bearing slide assembly 14 in its retracted or collapsed position as bulkhead door 12 is closed with respect to opening 10 (see, also, FIG. 5). An upper slide bracket 28 is attached to bulkhead door 12 and holds a portion of upper bulkhead door bearing slide assembly 14 (see, FIG. 8) to allow bulkhead door 12 to move in directions 18 and 20 with respect to bulkhead 8. Because upper bulkhead door bearing slide assembly 14 is retracted or collapsed, it provides a more secure support of bulkhead door 12 (see, also, FIGS. 8, 11A, and 11B).

As shown in FIG. 5, bulkhead door 12 is slid in direction 20 to an open position with respect to opening 10. Upper bulkhead door bearing slide assembly 14 includes a primary carriage 30 that is fastened or otherwise attached to wall panel 22 at a position located above opening 10. Primary carriage 30 remain stationary with respect to bulkhead door 12. Further, illustrative characteristics of primary carriage 30 may be seen in FIGS. 8, 11A, and 11B, for example. A sliding carriage 32 is movably coupled to primary carriage 30. Ball bearings for the like (not shown) may be positioned between primary and sliding carriage 30 and 32, as is known to one skilled in the art with regard to drawer-type slides and glides, allowing sliding carriage 32 to move in directions 18 and 20 with respect to primary carriage 30. A door carriage 34 (see FIG. 8) is fastened or otherwise attached to upper slide bracket 28, which, because it is attached to bulkhead door 12, moves with bulkhead door 12. Bearings, such as roller or ball, may be located between door carriage 34 and sliding carriage 32 so that door carriage 34 may move with respect to sliding carriage 32.

It will be appreciated by the skilled artisan upon reading this disclosure that this embodiment of upper bulkhead door bearing slide assembly 14 is similar to that of a cabinet drawer slide assembly with the exception of assembly 14 being larger gauge to accommodate the heavier weight inherent in bulkhead door 12. Additionally, upper bulkhead door bearing slide assembly 14 has its primary carriage 30 attached to the stationary structure (i.e., wall panel 22) rather than a moving structure which is typically what a primary carriage would be attached to. In other words, upper bulkhead door bearing slide assembly 14 is attached in a manner that is opposite of typical attachments that use a bearing slide assembly. That said, with upper bulkhead door bearing slide assembly 14 extended or retracted, it can support the weight of bulkhead door 12. Because of the issue of rattle with bulkhead door 12 while in its closed position, with upper bulkhead door bearing slide assembly 14 retracted (see, also FIGS. 8, 11A, and 11B), it is in its strongest position to hold bulkhead door 12. In other words, the vertical hold strength of upper bulkhead door bearing slide assembly 14 is greatest when it is retracted as is shown in FIG. 4 with bulkhead door 12 closed.

Figure 6:
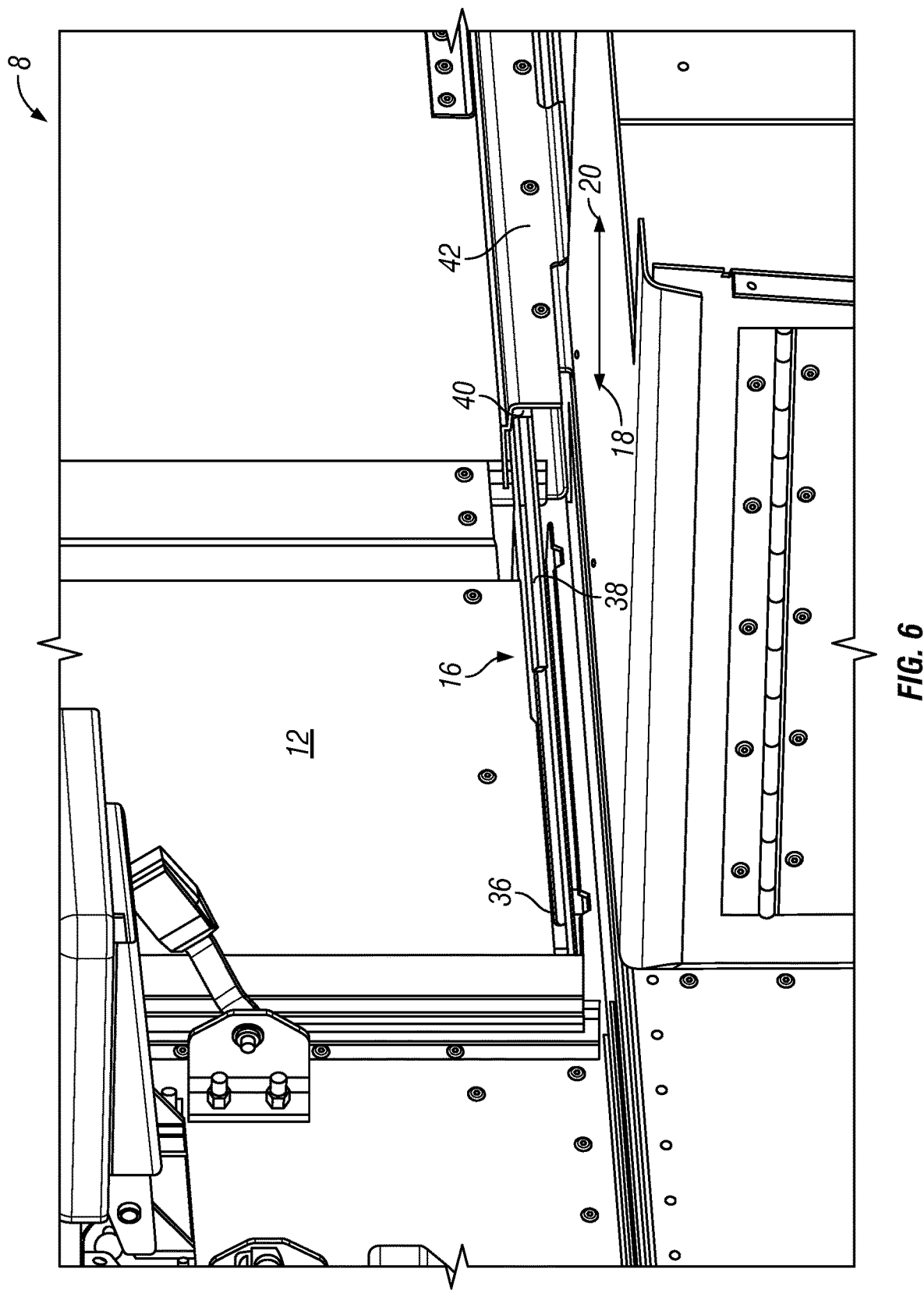
FIG. 6 is a perspective detail view of the bulkhead and bulkhead door located in the closed position.
Figure 7:
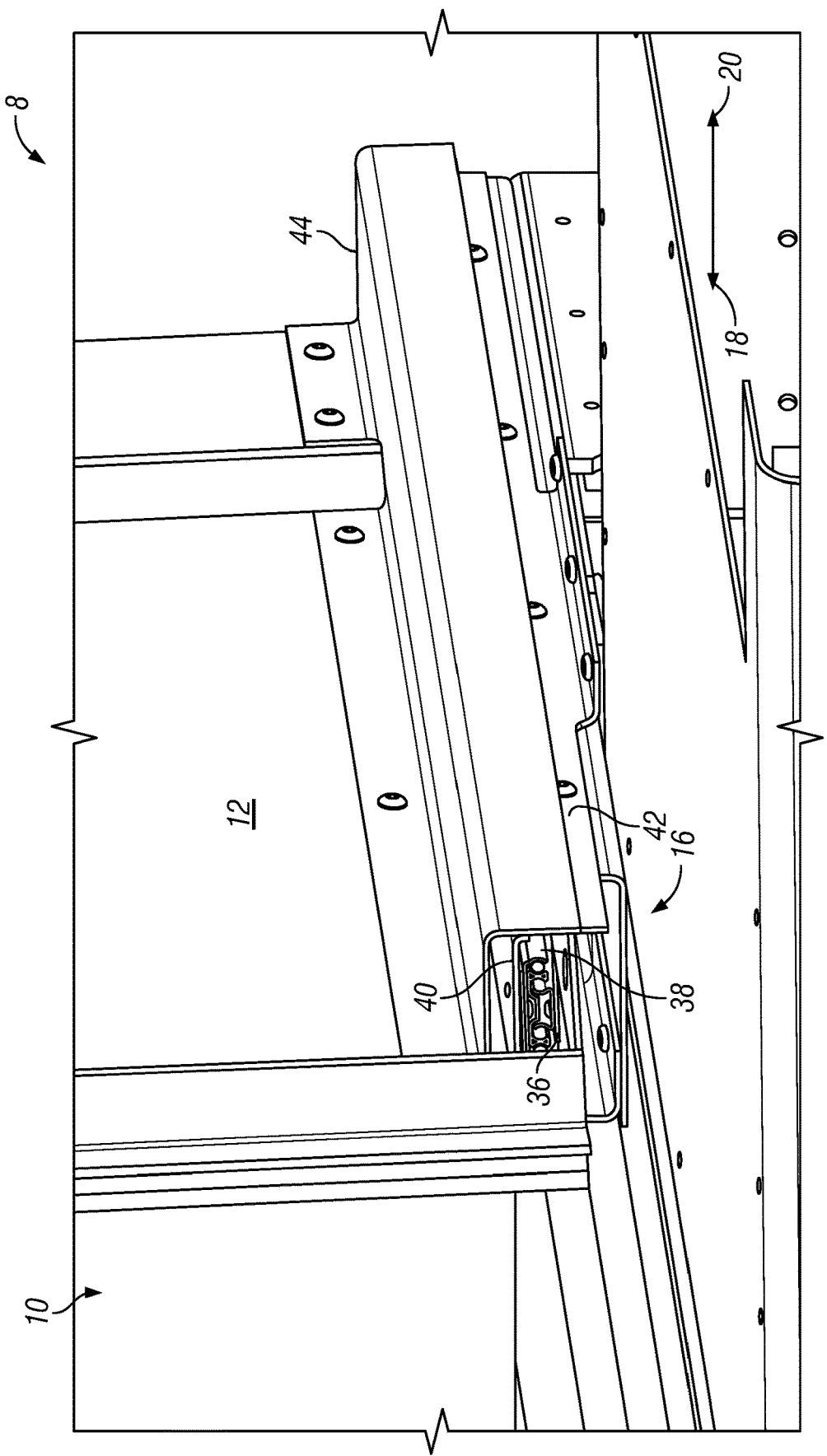
FIG. 7 is another perspective detail view of the bulkhead with the bulkhead door located in the open position.

Perspective detail views of bulkhead 8 with bulkhead door 12 located in closed and open positions are shown in FIGS. 6 and 7, respectively. As shown in FIG. 6, bulkhead door 12 has been slid in direction 18 to its closed position. At the bottom of bulkhead door 12, lower bulkhead door bearing slide assembly 16 is shown in an extended position. In the illustrative embodiment, and in contrast to upper bulkhead door bearing slide assembly 14 which is extended when bulkhead door 12 is open, lower bulkhead door bearing slide assembly 16 is extended when bulkhead door 12 is closed.

As depicted herein, lower bulkhead door bearing slide assembly 16 includes a primary carriage 36 that is attached to bulkhead door 12 (see, also FIGS. 9, 10, 12A, 12B, and 13) and moves with bulkhead door 12 when slid in directions 18 and 20. A sliding carriage 38 is movably coupled to primary carriage 36 via ball bearings or other bearing structure or surface that allows movement there between. A bulkhead carriage 40 is attached to a slide assembly bracket 42 in order to suspend lower bulkhead door bearing slide assembly 16 as it extends and retracts in directions 18 and 20. Further, in contrast to upper bulkhead door bearing slide assembly which has its bearing surfaces oriented vertically with bulkhead door 12, lower bulkhead door bearing slide assembly 16 has its bearings or bearing surfaces oriented horizontally, essentially perpendicular to the orientation of upper bulkhead door bearing slide assembly 14 (see, FIGS. 9, 10, 11A, 12A). The difference in the orientation of the bulkhead door bearing slide assemblies 14 and 16 are so that bulkhead door 12 takes advantage of their inherent strengths to achieve desired utilities. For example, with upper bulkhead door bearing slide assembly 14 oriented vertically (see, also, FIG. 8) it can better hold the weight (vertical force) of bulkhead door 12. This allows upper bulkhead door bearing slide assembly 14 to carry the weight of bulkhead door 12 while sliding in directions 18 and 20. In contrast, having lower bulkhead door bearing slide assembly 16 oriented about horizontally (see, also FIGS. 9 and 10), essentially about perpendicular to upper bulkhead door bearing slide assembly 14, horizontal movement of bulkhead door 12 can also be limited. Again, the issue with bulkhead door 12 is not only moving it between open and closed positions but it also moving horizontally and impacting structures on bulkhead 8 and/or misaligning horizontally to not abut jamb 26 properly. Lower bulkhead door bearing slide assembly 16 being oriented as shown takes advantage of its inherent strength being oriented generally horizontal to limit the movement of bulkhead door 12 horizontally.

The view shown in FIG. 7 depicts bulkhead door 12 moved in direction 20 to an open position with respect to opening 10 of bulkhead 8. Primary carriage 36 is recessed in sliding carriage 38, both being recessed in bulkhead carriage 40 within slide assembly bracket 42 to a collapsed position. This view also shows slide bracket 44 attached to bulkhead door 12 and configured to shroud lower bulkhead door bearing slide assembly 16 when bulkhead door 12 is moved to its closed position. It is further appreciated in this view that despite lower bulkhead door bearing slide assembly 16 being attached to bulkhead door 12 and being extendable and retractable in directions 18 and 20, it does not interfere with an operator during ingress and egress through opening 10 of bulkhead 8. When lower bulkhead door bearing slide assembly 16 is extended, bulkhead door 12 is closed so there is no issue of interference with ingress or egress of opening 10. Likewise, when bulkhead door 12 is open, lower bulkhead door bearing slide assembly 16 is retracted with respect to opening 10 so as still not interfering with ingress and egress by an operator.

Figure 8:
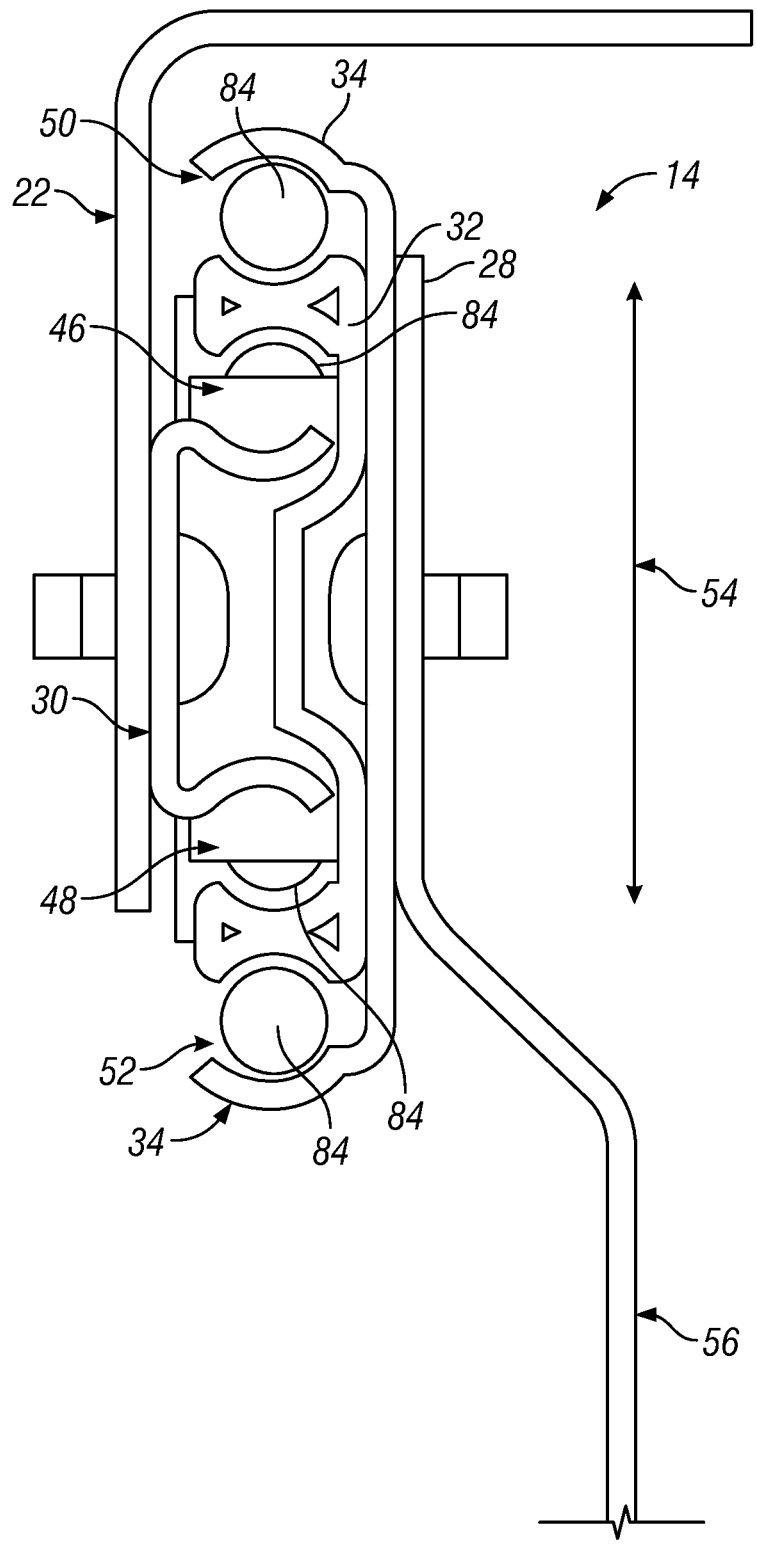
FIG. 8 is a side detail view of an upper portion of the bulkhead door bearing slide assembly attached to a bulkhead wall panel.

A side detail view of upper bulkhead door bearing slide assembly 14 attached to bulkhead wall panel 22 and upper slide bracket 28 is shown in FIG. 8. As depicted herein, primary carriage 30 is attached to bulkhead wall panel 22. Ball bearings 84 or other bearing members may be located in upper and lower bearing channels 46 and 48, respectively, formed between primary carriage 30 and sliding carriage 32 the vertical orientation of these two bearing channels 46 and 48 assist in supporting bulkhead door 12 when moving in directions 18 and 20. Similarly, upper and lower bearing channels 50 and 52 positioned between sliding carriage 32 and door carriage 34 receive ball bearings 84 or other bearing members to allow movement between door carriage 34 and sliding carriage 32. Furthermore, having upper and lower bearing channels 50 and 52 be vertically positioned like upper and lower bearing channels 46 and 48 assist in supporting bulkhead door 12 when sliding same on the ball bearings 84 or bearing members. The vertical orientation of these bearing channels create a strong support for bulkhead door 12. In addition, when all of these carriages 30, 32, and 34 are collapsed in each other when bulkhead door 12 is in its closed position (see, also, FIG. 4) upper bulkhead door bearing slide assembly 14 is in its strongest position to hold bulkhead door 12. Accordingly, the vertical orientation 54 of bearing channels 46, 48, 50, and 52 (that each include one or more bearings 84) creates a sufficient strength to vertically support bulkhead door 12 while allowing it to slide in directions 18 and 20. In an illustrative embodiment, the front side of bulkhead door 12 is indicated at floor 56. It is appreciated, however, that upper and lower bulkhead door bearing slide assemblies 14 and 16 may be located on the front side or backside of bulkhead door 12.

Figure 9:
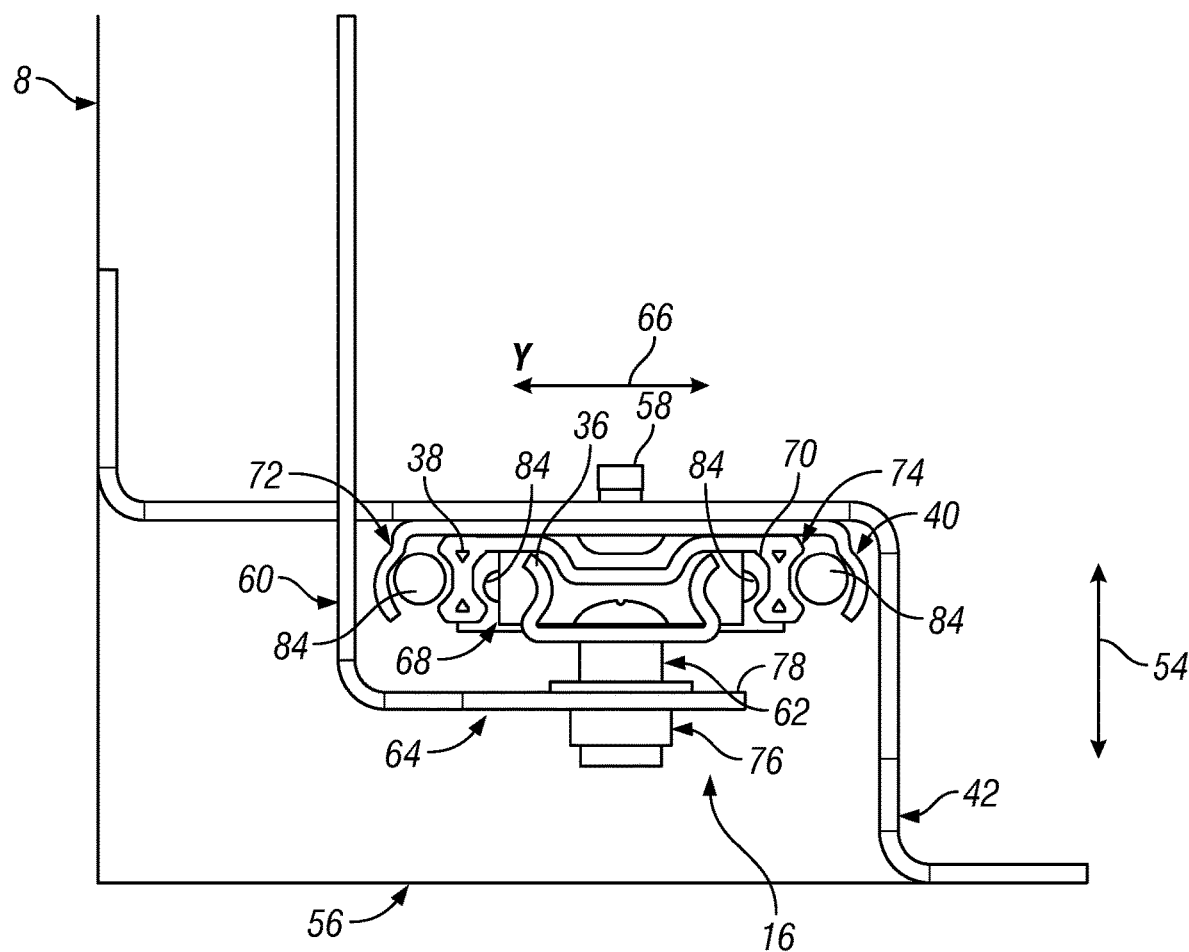
FIG. 9 is a side detail view of the lower bulkhead door bearing slide assembly.

A side detail view of lower bulkhead door bearing slide assembly 16 is shown in FIG. 9. As depicted herein, slide assembly bracket 42 is shown attached to both bulkhead 8 and floor 56 of cargo vehicle 2. Bulkhead carriage 40 is illustratively fastened to slide assembly bracket 42 with illustrative fastener 58. This keeps bulkhead carriage 40 stationary with respect to bulkhead door 12. To that end, door bracket 60 is attached to bulkhead door 12 or may be integrally formed thereto in order to support pin 62 of slide float assembly 64. Because lower bulkhead door bearing slide assembly, as depicted in this disclosure, is positioned in a horizontal orientation 66 about perpendicular to the vertical orientation 54 (see, FIG. 8), when primary carriage 36 is extended as bulkhead door 12 is closed, primary carriage 36 may have a tendency to sag as its orientation being perpendicular to vertical orientation 54 (i.e., the weight of gravity) is not as high of strength. As shown further in FIG. 9, inner bearing channels 68 and 70 located between primary carriage 36 and sliding carriage 38 contain ball bearings 84 or bearing surfaces which are horizontally, not vertically, aligned with each other. The same is the case with outer bearing channels 72 and 74 located between sliding carriage 38 and bulkhead carriage 40 as shown. It is appreciated herein that bearing channels 68, 70, 72, and 74 are horizontally oriented pursuant to horizontal orientation 66 which provides sufficient strength to limit the movement of bulkhead door 12 in horizontal orientation 66. But with the extension of primary carriage 36 in illustrative direction 18 towards the closed position of bulkhead door 12 (see, also, FIG. 6) it is possible to create misalignment between primary carriage 36 and bulkhead door 12 in vertical orientation 54. As such slide float assembly 64 accommodates any vertical misalignment that may occur between bulkhead door 12 and primary carriage 36 of lower bulkhead door bearing slide assembly 16. A bushing 76 may be disposed in bottom panel 78 of door bracket 60. Support pin 62, attached to a portion of primary carriage 36, is received in, and may be movably disposed within, bushing 76. This allows primary carriage 36 to move in vertical orientation 54 independent of bulkhead door 12 to accommodate any vertical misalignment between primary carriage 36 and bulkhead door 12.

Figure 10:
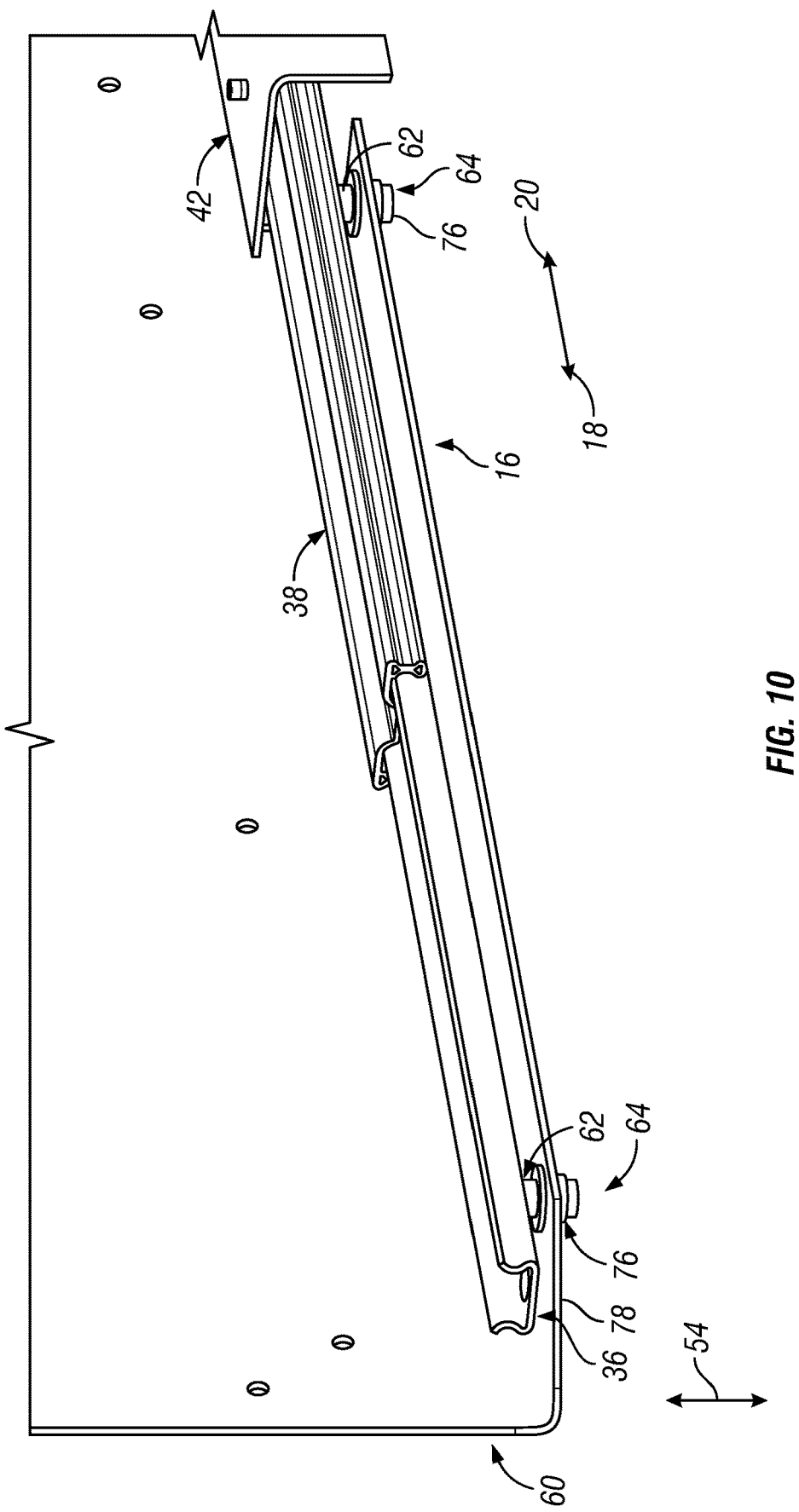
FIG. 10 is a perspective detail view of the lower bulkhead door bearing slide assembly in an extended position when the bulkhead door is closed.

A perspective detail view of lower bulkhead door bearing slide assembly 16 in an extended position when bulkhead door 12 is closed, is shown in FIG. 10. As depicted in this view, primary carriage 36 extends from sliding carriage 38, and both from bulkhead carriage, 40 (see, also, FIG. 6). In this view slide assembly bracket 42 illustratively conceals visibility of bulkhead carriage 40 from this perspective. Door bracket 60 or bulkhead door 12 itself may include bottom panel 78 extending underneath lower bulkhead door bearing slide assembly 16 in order to accommodate one or more slide float assemblies 64. In an illustrative embodiment, one or more slide float assemblies 64 may be attached to primary carriage 36 and disposed in bottom panel 78. Support pin 62 extends through bushing 76, so that any movement in vertical orientation 54 that may occur by primary carriage 36, allows support pin 62 to move within bushing 76 along vertical orientation 54 so that any movement or misalignment between lower bulkhead door bearing slide assembly 16 and bulkhead door 12 does not interfere with the operation of bulkhead door 12 sliding in either direction 18 or 20. Additionally, by accounting for this potential misalignment between structures, there is less manufacturing precision needed when assembling bulkhead door 12 to bulkhead 8 using bulkhead door bearing slide assemblies 14 and 16. Illustratively, support pin 62 may comprise a fastener disposed through primary carriage 36 and into a longitudinally extending pin that includes a bearing-type surface about its outer periphery. That bearing surface may abut an inner surface of the peripheral wall of bushing 76. The friction between the outer surface of support pin 62 and the inner peripheral surface of bushing 76 may be low enough to allow movement between the pin and the bushing. As such, any misalignment that may occur between lower bulkhead door bearing slide assembly 16 and bulkhead door 12 will not interfere with the same moving between open and closed positions while at the same time allowing lower bulkhead door bearing slide assembly 16 to maintain horizontal orientation 66 of bulkhead door 12 to prevent same from rattling or itself misaligning with 26 of opening 10.

Side elevational and end views of a bulkhead door bearing slide assembly such as the type used for assemblies 14 and 16 are shown in FIGS. 11A and 11B and FIGS. 12A and 12B. The distinction in the views is that bulkhead door bearing slide assembly 14, 16 is positioned in its retracted position in FIG. 11A, and in its extended position in FIG. 12A. When upper bulkhead door bearing slide Assembly 14 is located in its retracted position, bulkhead door 12 is closed (see FIG. 4). Conversely, when lower bulkhead door bearing slide assembly 16 is also located in its retracted position, as is also shown in FIG. 11A, bulkhead door 12 is open (see FIG. 7). In contrast, when upper bulkhead door bearing slide assembly 14 is in its extended position as shown in FIG. 12A, bulkhead door 12 is located in its open position (see FIG. 5). Likewise, when lower bulkhead door bearing slide assembly is extended such as that shown in FIG. 12A, bulkhead door 12 is located in its closed position.

From the view shown in FIGS. 11A and 11B, when bulkhead door bearing slide assembly 14, 16 is fully retracted, meaning that primary carriage 30, 36, sliding carriage 32, 38, and door or bulkhead carriages 34 and 40, respectively, are slid together as shown, the slide assembly is in a strongest position along vertical orientation 54. Additionally, when retracted as shown, bearing slide assemblies 14, 16 are believed to also have high hold strength with the ball bearings 84 in bearing channels. 46, 48, 50, 52 and 68, 70, 72, [H]74, which holds the bearing assembly without appreciable movement in horizontal orientation 66. This is why when bulkhead door 12 is located in its closed position, upper bulkhead door bearing slide assembly 14 is retracted into the position shown in FIGS. 11A and 11B (see, also, FIG. 4). In this way, upper bulkhead door bearing slide assembly 14 holds bulkhead door 12 securely in both vertical orientation 54 and horizontal orientation 66.

In contrast, when either bulkhead door bearing slide assemblies 14 or 16 are extended as shown and FIG. 12A or 12B, the strength of the bulkhead door bearing slide assemblies are not the same. Here, primary carriage 30, 36 is extended from sliding carriage[H] 32, 38, and both extended from door, bulkhead carriage is 34, 40, respectively. When fully extended ball bearings 84 located within bearing channels 46-52, or 68-74 still help create sufficient strength of the bulkhead door bearing slide assembly at lateral orientation 80 regardless of whether bulkhead door bearing slide assembly 14, 16 is oriented vertically (e.g. vertical orientation 54), or horizontally (e.g. horizontal orientation 66). Either bulkhead door bearing slide assembly 14 or 16 can accommodate such lateral forces. To the contrary, however, when extended as shown in FIG. 12A, bulkhead door bearing slide assembly 14, 16 has less strength in its tangential orientation 82, again, regardless of whether it is vertically or horizontally orientated. With primary carriage 36 extended while in horizontal orientation 66 as shown in FIGS. 6 and 10, it does not have sufficient strength in the tangential orientation 82 to prevent some amount of sag by weight of the primary carriage itself (even if slight).

In light of this disclosure, however, the purpose of lower bulkhead door bearing slide assembly 16 is to hold door 12 securely and horizontal orientation 66 shown in FIGS. 7, 9, and 10, for example, and not necessarily in vertical orientation 54. Again, lower bulkhead door bearing slide assembly 16 is holding bulkhead door 12 in horizontal orientation 66 while moving in directions 18 and 20, and particularly when bulkhead door 12 is in its closed position to assist in preventing same from rattling while cargo vehicle 2 is moving. The strength lower bulkhead door bearing slide assembly 16 has in horizontal orientation 66 is believed to assist in this task. That said, lower bulkhead door bearing slide assembly 16 is not required to support bulkhead door 12 in vertical orientation 54 since that is accomplished by upper bulkhead door bearing slide assembly 14. That said, the weakness of an extended bulkhead door bearing slide assembly in transverse orientation 82 should not prohibit or otherwise interfere with bulkhead door 12 moving between open and closed positions. Furthermore, to make such a door slide assembly practical, such precise tolerances between positioning of upper and lower bulkhead door bearing slide assemblies 14 and 16 are not believed to be needed. Hence, slide float assemblies 64 allow primary carriage 36 to move in vertical orientation 54 without interfering with movement of bulkhead door 12.

Figure 13:
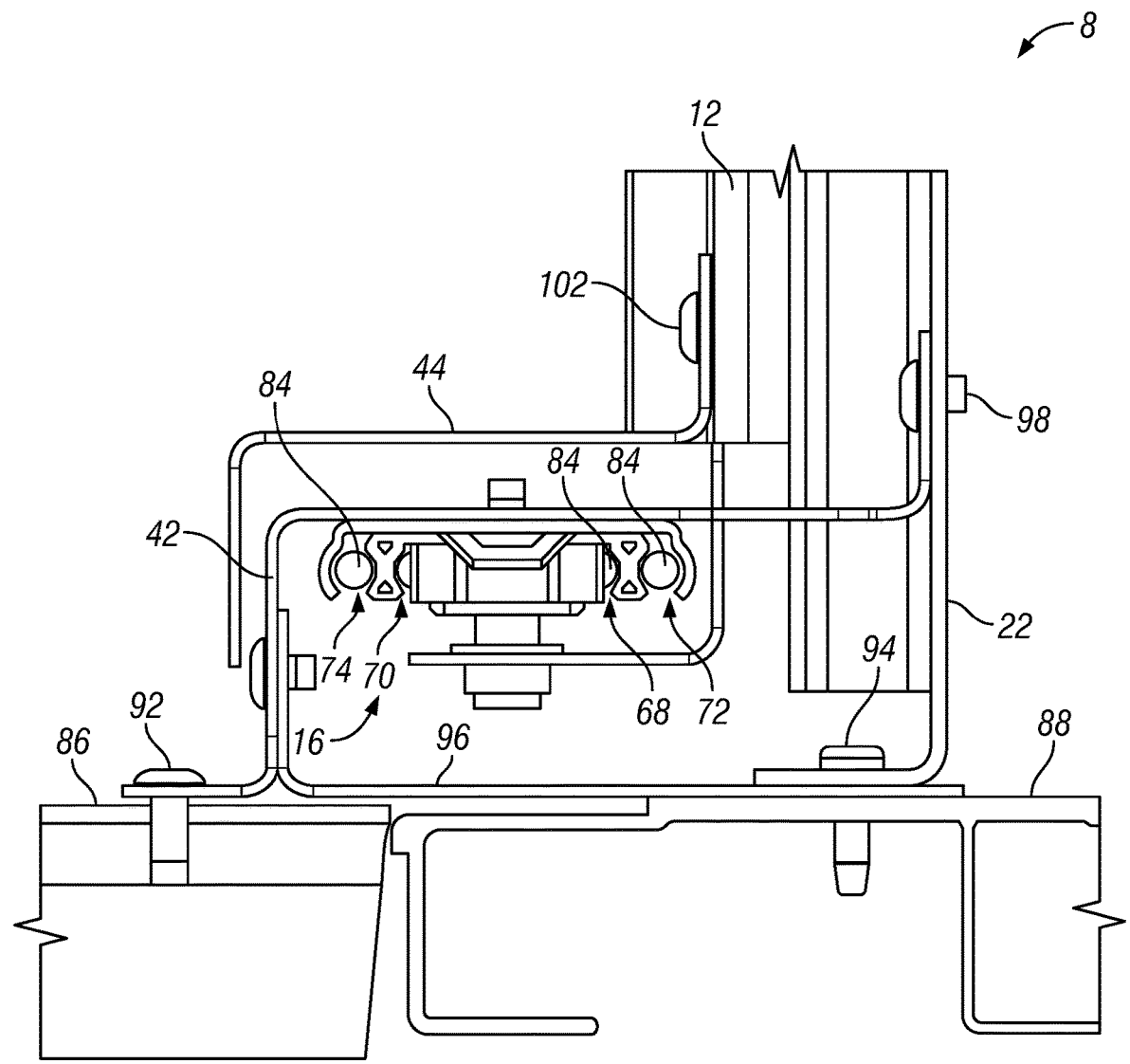
FIG. 13 is a side detail view of the lower bulkhead door bearing slide assembly.

A side detail view of lower bulkhead door bearing slide assembly 16 taken from the opposite side from that shown in FIG. 9, is shown in FIG. 13. This view shows illustrative ball bearings 84 located in bearing channels 72, 68, 70, and 74. It is appreciated, as well as known by those skilled in the art that a plurality of ball bearings 84 may extend within each of the bearing channels. This view also shows how slide assembly bracket 42 may be attached to floor planks 86 and 88 via fasteners 92 and 94 along with base bracket 96. Bulkhead wall panel 22 may also be attached to floor plank 88 illustratively via fastener 94 as well. Fastener 98 attaches slide assembly bracket 42 to wall panel 22 of bulkhead 8 thereby assuring securement of lower bulkhead door bearing slide assembly 16 in the position as shown. Also shown in this view, and the perspective view of FIG. 14 is slide bracket 44 attached to bulkhead door 12 via fastener 102 for purposes of shrouding lower bulkhead door bearing slide assembly 16 concealing same from general view. Slide bracket 44 may also protect lower bulkhead door bearing slide assembly 16 from inadvertent damage from impact or the like.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

What is claimed:

1. A cargo vehicle comprising:
a driver compartment;
a cargo compartment;
a bulkhead located between the driver and cargo compartments;
wherein the bulkhead includes an opening;
a bulkhead door located at the bulkhead;
wherein the bulkhead door is movable between open and closed positions with respect to the opening;
an upper bulkhead door bearing slide assembly located at an upper portion of the bulkhead door;
a lower bulkhead door bearing slide assembly located at a lower portion of the bulkhead door;
wherein the upper bulkhead door bearing slide assembly includes at least a first carriage and a second carriage, wherein the first carriage is movable between extended and retracted positions with respect to the second carriage;
wherein the lower bulkhead door bearing slide assembly includes at least a first carriage and a second carriage, wherein the first carriage is movable between extended and retracted positions with respect to the second carriage;
wherein the upper and lower bulkhead door bearing slide assemblies are oriented transverse to each other;
wherein the first carriage of the upper bulkhead door bearing slide assembly is attached to the bulkhead and the second carriage of the upper bulkhead door bearing slide assembly is attached to the door such that when the bulkhead door is in the closed position the first carriage is located in the retracted position with respect to the second carriage; and
wherein the first carriage of the lower bulkhead door bearing slide assembly is movably coupled to the bulkhead door and wherein the second carriage of the lower bulkhead door bearing slide assembly is attached to the bulkhead such that when the bulkhead door is in the closed position the first carriage is located in the extended position with respect to the second carriage.

2. The cargo vehicle of claim 1, further comprising at least one pin attached to the first carriage of the lower bulkhead door bearing slide assembly and disposed through at least one opening of at least a portion of the bulkhead door, wherein the at least one pin is movable within the at least one portion of the bulkhead door to be movably coupled to the bulkhead door.

3. The cargo vehicle of claim 2, further comprising at least one bushing disposed through the at least one opening of the at least the portion of the bulkhead door, wherein the at least one bushing receives the at least one pin which is movable relative to the at least one bushing.

4. The cargo vehicle of claim 1, further comprising a float assembly that is located between a portion of the bulkhead door and the first carriage of the lower bulkhead door bearing slide assembly to allow downward movement of the first carriage with respect to the bulkhead door.

5. The cargo vehicle of claim 4, wherein the portion of the bulkhead door extends transverse from the bulkhead door, wherein the float assembly movably couples the first carriage of the lower bulkhead door bearing slide assembly to the portion of the bulkhead door.

6. The cargo vehicle of claim 1, wherein the upper bulkhead door bearing slide assembly includes a third carriage movably coupled to the first and second carriages of the upper bulkhead door bearing slide assembly, and the lower bulkhead door bearing slide assembly includes a third carriage movably coupled to the first and second carriages of the lower bulkhead door bearing slide assembly.

7. The cargo vehicle of claim 6, wherein at least one ball bearing is located in a first channel located between a first side of the first carriage and a first side of the third carriage of the upper bulkhead door bearing slide assembly, at least one ball bearing located in a second channel located between a second side of the first carriage and a second side of the third carriage of the upper bulkhead door bearing slide assembly, at least one ball bearing located in a third channel located between a third side of the third carriage and a first side of the second carriage of the upper bulkhead door bearing slide assembly, and at least one ball bearing located in a fourth channel located between a fourth side of the third carriage and a second side of the second carriage of the upper bulkhead door bearing slide assembly.

8. The cargo vehicle of claim 7, wherein collectively the first channel, the second channel, the third channel, and the fourth channel of the upper bulkhead door bearing slide assembly is oriented substantially vertical with respect to the bulkhead door.

9. The cargo vehicle of claim 8, wherein at least one ball bearing is located in a first channel located between a first side of the first carriage and the first side of the third carriage of the lower bulkhead door bearing slide assembly, at least one ball bearing located in a second channel located between a second side of the first carriage and a second side of the third carriage of the lower bulkhead door bearing slide assembly, at least one ball bearing located in a third channel located between a third side of the third carriage and a first side of the second carriage of the lower bulkhead door bearing slide assembly, and at least one ball bearing located in a fourth channel located between a fourth side of the third carriage and a second side of the second carriage of the lower bulkhead door bearing slide assembly.

10. The cargo vehicle of claim 9, wherein collectively the first channel, the second channel, the third channel, and the fourth channel of the lower bulkhead door bearing slide assembly is oriented transverse with respect to the collectively the first channel, the second channel, the third channel, and the fourth channel of the upper bulkhead door bearing slide assembly.

11. The cargo vehicle of claim 9, wherein the upper and lower bulkhead door bearing slide assemblies are oriented substantially perpendicular to each other.

12. A cargo vehicle comprising:
a bulkhead located on the cargo vehicle;
wherein the bulkhead includes an opening;
a bulkhead door located at the bulkhead;
wherein the bulkhead door is movable between open and closed positions with respect to the opening; and
a lower bulkhead door bearing slide assembly located at a lower portion of the bulkhead door;
wherein the lower bulkhead door bearing slide assembly includes at least a first carriage and a second carriage, wherein the first carriage is movable between extended and retracted positions with respect to the second carriage; and
wherein the first carriage of the lower bulkhead door bearing slide assembly is movably coupled to the bulkhead door and wherein the second carriage of the lower bulkhead door bearing slide assembly is attached to the bulkhead such that when the bulkhead door is in the closed position the first carriage is located in the extended position with respect to the second carriage.

13. The cargo vehicle of claim 12, further comprising a driver compartment and a cargo compartment, wherein the bulkhead is located between the driver and cargo compartments.

14. The cargo vehicle of claim 12, further comprising an upper bulkhead door bearing slide assembly located at an upper portion of the bulkhead door, wherein the upper bulkhead door bearing slide assembly includes at least a first carriage and a second carriage, wherein the first carriage of the upper bulkhead door bearing slide assembly is movable between extended and retracted positions with respect to the second carriage, and wherein the first carriage of the upper bulkhead door bearing slide assembly is attached to the bulkhead and the second carriage of the upper bulkhead door bearing slide assembly is attached to the door such that when the bulkhead door is in the closed position the first carriage is located in the retracted position with respect to the second carriage.

15. The cargo vehicle of claim 14, wherein the upper and lower bulkhead door bearing slide assemblies are oriented transverse to each other.

16. The cargo vehicle of claim 15, further comprising at least one pin attached to the first carriage of the lower bulkhead door bearing slide assembly and disposed through at least one opening of at least a portion of the bulkhead door, wherein the at least one pin is movable within the at least opening of the at least one portion of the bulkhead door to movably couple the lower bulkhead door bearing slide assembly to the bulkhead door.

17. A cargo vehicle comprising:
a bulkhead located on the cargo vehicle;
wherein the bulkhead includes an opening;
a bulkhead door located at the bulkhead;
wherein the bulkhead door is movable between open and closed positions with respect to the opening;
a bulkhead door bearing slide assembly located at a portion of the bulkhead door and movable with the bulkhead door between the open and closed positions of the bulkhead door; and
at least one pin attached to the bulkhead door bearing slide assembly and disposed through at least one opening of at least a portion of the bulkhead door, wherein the at least one pin is movable within the at least one opening of the at least the portion of the bulkhead door to movably couple to the bulkhead door.

18. The cargo vehicle of claim 17, wherein the bulkhead door bearing slide assembly is a lower bulkhead door bearing slide assembly located at a lower portion of the bulkhead door.

19. The cargo vehicle of claim 18, wherein the lower bulkhead door bearing slide assembly is oriented substantially parallel to the lower portion of the bulkhead door and substantially transverse to a second portion of the bulkhead door.

20. The cargo vehicle of claim 18, wherein the lower bulkhead door bearing slide assembly includes at least a first carriage and a second carriage, wherein the first carriage is movable between extended and retracted positions with respect to the second carriage, and wherein the first carriage of the lower bulkhead door bearing slide assembly is movably coupled to the bulkhead door.

* * * * *